US012620345B2

(12) United States Patent
Lee

(10) Patent No.: US 12,620,345 B2
(45) Date of Patent: May 5, 2026

(54) DISPLAY APPARATUS

(71) Applicant: LG Display Co., Ltd., Seoul (KR)

(72) Inventor: Kunyoung Lee, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 18/887,515

(22) Filed: Sep. 17, 2024

(65) Prior Publication Data

US 2025/0218348 A1 Jul. 3, 2025

(30) Foreign Application Priority Data

Dec. 28, 2023 (KR) ........................ 10-2023-0194613

(51) Int. Cl.

*G09G 3/32* (2016.01)
*G09G 3/30* (2006.01)
*G09G 3/3233* (2016.01)
*G09G 3/3266* (2016.01)
*G09G 3/36* (2006.01)
*G09G 3/20* (2006.01)

(52) U.S. Cl.

CPC ................. *G09G 3/32* (2013.01); *G09G 3/30* (2013.01); *G09G 3/3233* (2013.01); *G09G 3/3266* (2013.01); *G09G 3/3648* (2013.01); *G09G 3/3677* (2013.01); *G09G 3/20* (2013.01); *G09G 2300/0842* (2013.01); *G09G 2310/02* (2013.01); *G09G 2310/0264* (2013.01); *G09G 2310/0286* (2013.01); *G09G 2310/08* (2013.01); *G09G 2320/0223* (2013.01); *G09G 2320/0233* (2013.01); *G09G 2320/045* (2013.01)

(58) Field of Classification Search

CPC .......... G09G 3/30; G09G 3/32; G09G 3/3266; G09G 2300/0842; G09G 2310/02; G09G 2310/0264; G09G 2310/0286; G09G 2310/08; G09G 2320/0223; G09G 2320/045

USPC .......................................................... 345/204

See application file for complete search history.

(56) References Cited

U.S. PATENT DOCUMENTS 7,893,718 B2 * 2/2011 Park ..................... H03K 17/005
326/87
2010/0039146 A1 * 2/2010 Park ..................... H03K 17/005
327/108
2015/0213746 A1 * 7/2015 Kim ....................... G11C 19/28
345/215

(Continued)

FOREIGN PATENT DOCUMENTS

KR 10-2439225 B1 9/2022

*Primary Examiner* — Jason M Mandeville
(74) *Attorney, Agent, or Firm* — Morgan, Lewis & Bockius LLP

(57) ABSTRACT

A display apparatus is disclosed. An aspect of the present disclosure is directed to providing a display apparatus capable of supplying an auxiliary voltage to a floating node between first and second transistors configuring a pull-up transistor of a gate driver. The display apparatus may include a plurality of pixels connected to a gate line, and a stage configured to output a gate signal to the gate line, wherein the stage includes a pull-up transistor provided between a clock line configured to receive a gate clock and the gate line, the pull-up transistor includes a first transistor and a second transistor connected to each other, and an auxiliary capacitor is connected to a floating node between the first transistor and the second transistor.

10 Claims, 8 Drawing Sheets

(56) References Cited

U.S. PATENT DOCUMENTS

| | | | | |
|---|---|---|---|---|
| 2017/0061878 | A1 | 3/2017 | Park et al. | |
| 2018/0151125 | A1* | 5/2018 | Lee | G09G 3/3266 |
| 2019/0073932 | A1* | 3/2019 | Huang | G09G 3/3266 |

* cited by examiner

DISPLAY APPARATUS

CROSS-REFERENCE TO RELATED APPLICATION

This application claims the benefit of Korean Patent Application No. 10-2023-0194613, filed on Dec. 28, 2023, which is hereby incorporated by reference as if fully set forth herein.

BACKGROUND

Field

The present disclosure relates to a display apparatus.

Discussion of the Related Art

Light emitting display apparatuses are mounted on or provided in electronic products such as televisions, monitors, notebook computers, smart phones, tablet computers, electronic pads, wearable devices, watch phones, portable information devices, navigation devices, or vehicle control display apparatus, etc., to display images.

A display apparatus may be a liquid crystal display apparatus or a light emitting display apparatus, and a display apparatus includes a display panel on which an image is output.

A gate driver provided in a display panel includes a pull-up transistor connected to a gate line.

If a pull-up transistor is continuously stressed, a gate pulse output to a gate line may not be normally output, and accordingly, a horizontal band-shaped defect can occur in a display panel.

SUMMARY

Accordingly, the present disclosure is directed to providing a light emitting display apparatus that substantially obviates one or more problems due to limitations and disadvantages of the related art.

An aspect of the present disclosure is directed to providing a display apparatus capable of supplying an auxiliary voltage to a floating node between first and second transistors configuring a pull-up transistor of a gate driver.

Additional advantages and features of the disclosure will be set forth in part in the description which follows and in part will become apparent to those having ordinary skill in the art upon examination of the following or can be learned from practice of the disclosure. The objectives and other advantages of the disclosure can be realized and attained by the structure particularly pointed out in the written description as well as the appended drawings.

To achieve these and other advantages and in accordance with the purpose of the disclosure, as embodied and broadly described herein, there is provided a display apparatus comprising a plurality of pixels connected to a gate line, and a stage configured to output a gate signal to the gate line, wherein the stage includes a pull-up transistor provided between a clock line configured to receive a gate clock and the gate line, the pull-up transistor includes a first transistor and a second transistor connected to each other, and an auxiliary capacitor is connected to a floating node between the first transistor and the second transistor.

It is to be understood that both the foregoing general description and the following detailed description of the present disclosure are by way of example and are intended to provide further explanation of the disclosure as claimed.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain the principles of the disclosure. In the drawings.

DETAILED DESCRIPTION

Figure 1:
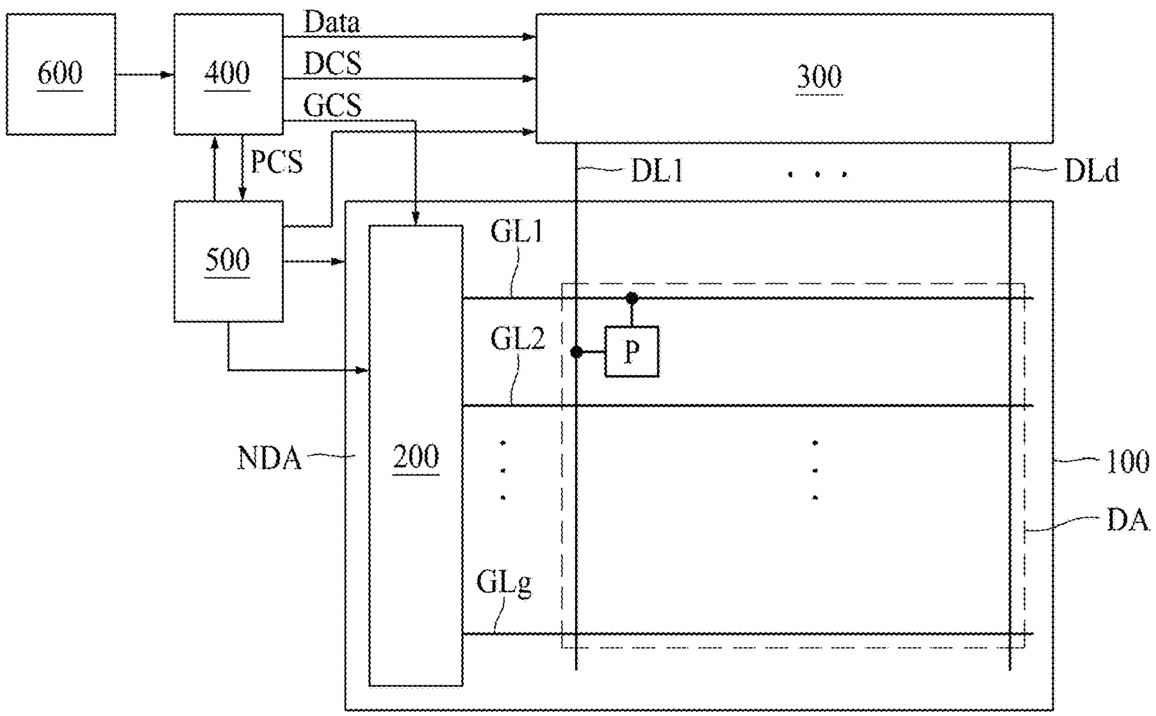
FIG. 1 is an example diagram illustrating a configuration of a display apparatus according to an embodiment of the present disclosure.

Reference will now be made in detail to various embodiments of the present disclosure, examples of which are illustrated in the accompanying drawings. Wherever possible, the same reference numbers will be used throughout the drawings to refer to the same or like parts.

Advantages and features of the present disclosure and methods of achieving them will become apparent with reference to the example embodiments described below in detail in conjunction with the accompanying drawings. The present disclosure may, however, be embodied in different forms and should not be construed as limited to the example embodiments set forth herein. Rather, these example embodiments are provided so that this disclosure will be thorough and complete and will fully convey the scope of the present disclosure to those skilled in the art.

The shapes, dimensions, areas, lengths, thicknesses, ratios, angles, numbers, and the like, which are illustrated in the drawings to describe various example embodiments of the present disclosure, are merely given by way of example. Therefore, the present disclosure is not limited to such illustrated details in the drawings. Like reference numerals generally denote like elements throughout the specification, unless otherwise specified.

In the following description, where a detailed description of a relevant known function or configuration may unnecessarily obscure aspects of the present disclosure, a detailed description of such a known function or configuration may be omitted or be briefly discussed.

Where a term like "comprise," "have," or "include" is used, one or more other elements may be added unless the term is used with a more limiting term, such as "only" or the like. An element described in a singular form may include a plurality of elements, and vice versa, unless the context clearly indicates otherwise.

In construing an element, the element should be construed as including an error or tolerance range even where no explicit description of such an error or tolerance range is provided.

Where a positional relationship between two elements is described with such a term as "on," "above," "under," "next," or the like, one or more other elements may be located between the two elements unless the term is used with a more limiting term, such as "immediate(ly)" or "direct(ly)."

In describing a temporal relationship, where the temporal order is described as, for example, "after," "subsequent," "next," and "before," or the like, a case that is not consecutive or not sequential can be included and thus one or more other events can occur therebetween, unless a more limiting term, such as "just," "immediate(ly)," or "direct(ly)," is used.

Although terms "first," "second," and the like may be used herein to describe various elements, these elements should not be interpreted to be limited by these terms as they are not used to define a particular essence, order, sequence, precedence, or number of such elements. These terms are used only to refer one element separately from another. For example, a first element could be termed a second element, and a second element could similarly be termed a first element, without departing from the scope of the present disclosure.

In describing elements of the present disclosure, such terms as "first," "second," "A," "B," "(a)," "(b)," may be used. These terms are intended to identify the corresponding elements separately from the other elements, and are not used to define the essence, basis, sequence, order, or number of the elements.

For the expression that an element or layer is "connected," "coupled," or "adhered" to another element or layer, the element or layer may not only be directly connected, coupled, or adhered to another element or layer, but also be indirectly connected, coupled, or adhered to another element or layer with one or more intervening elements or layers disposed or interposed between the elements or layers, unless otherwise specified.

The term "at least one" should be understood as including any and all combinations of one or more of the associated listed items. For example, the meaning of "at least one of a first item, a second item, and a third item" denotes the combination of all items proposed from two or more of the first item, the second item, and the third item as well as the first item, the second item, or the third item.

Features of various embodiments of the present disclosure may be partially or wholly coupled to or combined with each other, and may be operated, linked, or driven together in various ways as those skilled in the art can sufficiently understand. The embodiments of the present disclosure may be carried out independently from each other or may be carried out together in association with each other.

Hereinafter, embodiments of the present disclosure will be described in detail with reference to the accompanying drawings.

Figure 2A:
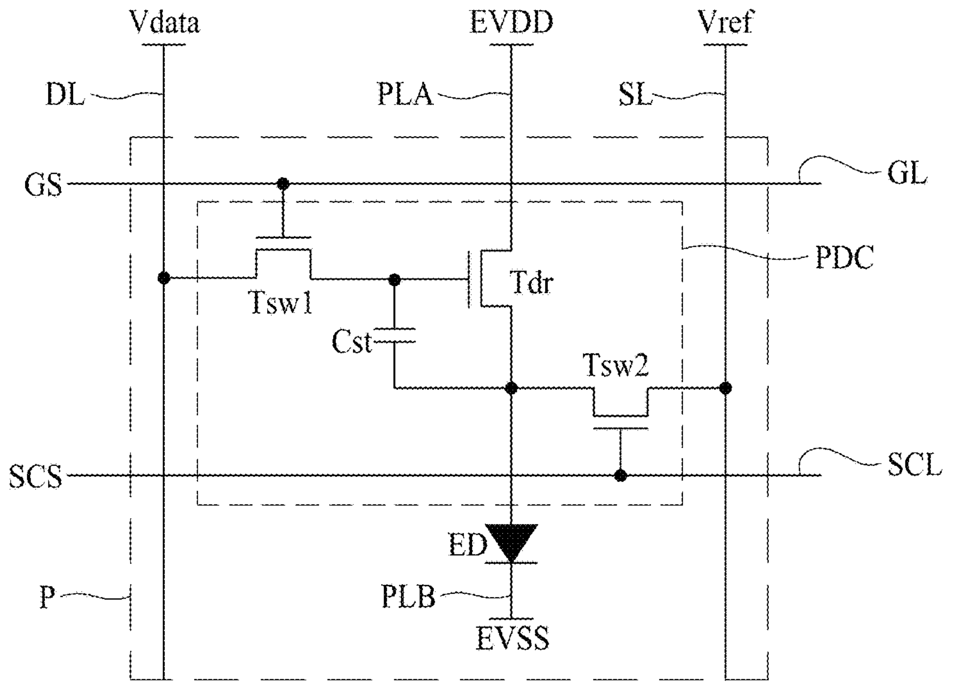
FIGS. 2A and 2B are example diagrams illustrating a structure of a pixel applied to a display apparatus according to an embodiment of the present disclosure.
Figure 2B:
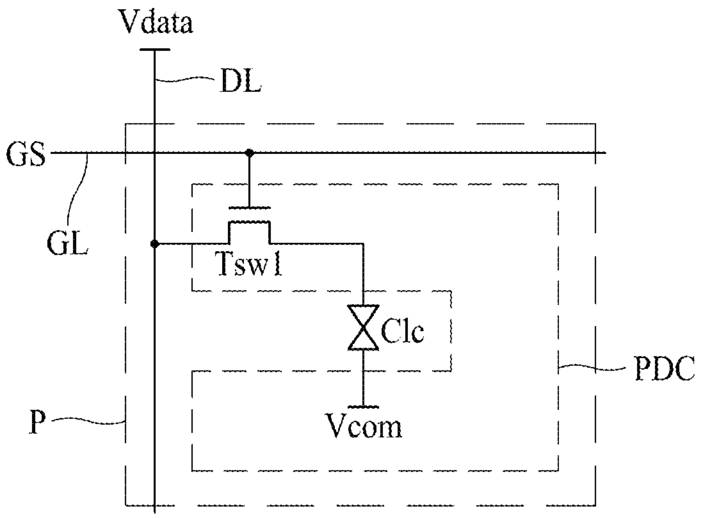
Figure 3:
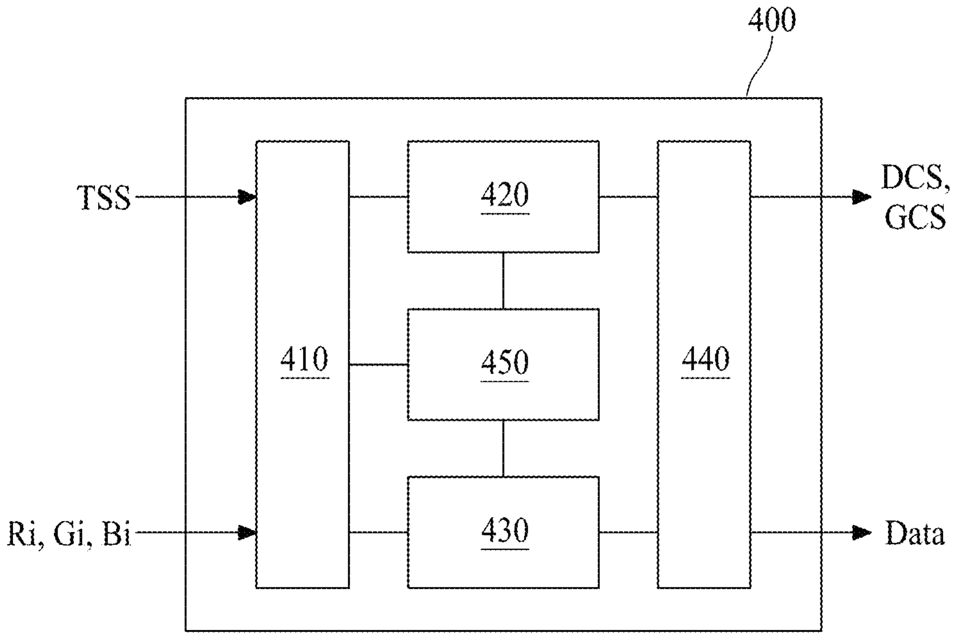
FIG. 3 is an example diagram illustrating a structure of a control driver applied to a display apparatus according to an embodiment of the present disclosure.
Figure 4:
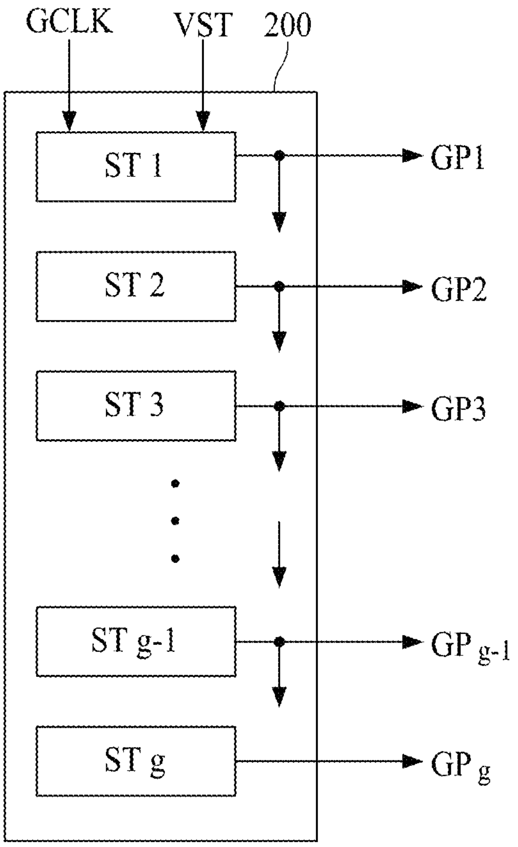
FIG. 4 is an example diagram illustrating a structure of a gate driver applied to a display apparatus according to an embodiment of the present disclosure.
Figure 5:
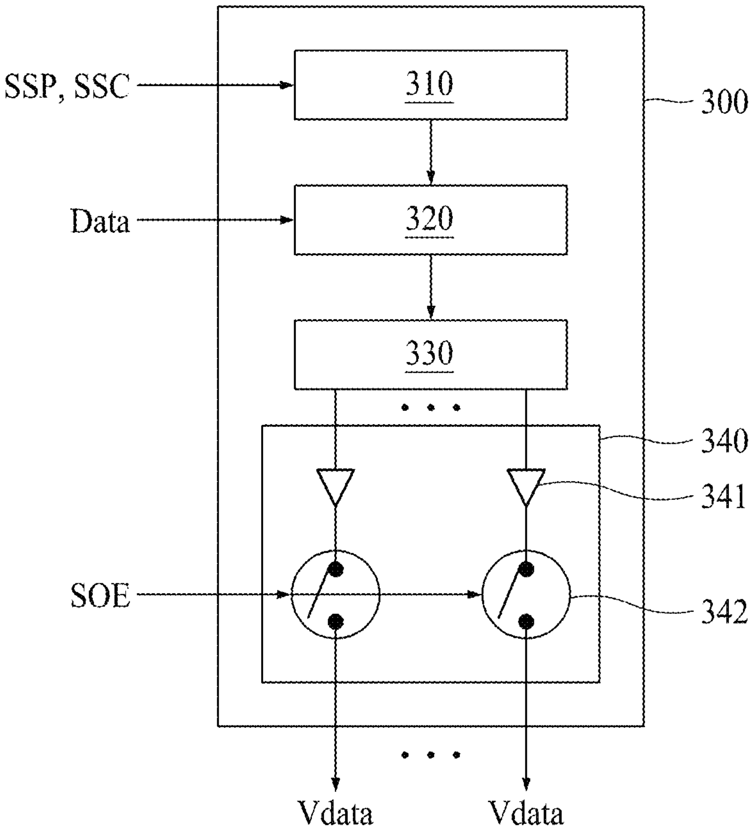
FIG. 5 is an example diagram illustrating a structure of a data driver applied to a display apparatus according to an embodiment of the present disclosure.

FIG. 1 is an example diagram illustrating a configuration of a display apparatus according to an embodiment of the present disclosure, FIGS. 2A and 2B are example diagrams illustrating a structure of a pixel applied to a display apparatus according to an embodiment of the present disclosure, FIG. 3 is an example diagram illustrating a structure of a control driver applied to a display apparatus according to an embodiment of the present disclosure, FIG. 4 is an example diagram illustrating a structure of a gate driver applied to a display apparatus according to an embodiment of the present disclosure, and FIG. 5 is an example diagram illustrating a structure of a data driver applied to a display apparatus according to an embodiment of the present disclosure.

A display apparatus according to an embodiment of the present disclosure can be used as various kinds of electronic devices. Electronic devices can be, for example, televisions, monitors, etc.

A display apparatus according to an embodiment of the present disclosure, as illustrated in FIGS. 1, 2A and 2B, can include a display panel 100 which includes a display area DA displaying an image and a non-display area NDA provided outside the display area DA, a gate driver 200 which supplies gate signals GS to a plurality of gate lines GL1 to GLg provided in the display area DA of the display panel 100, a data driver 300 which supplies data voltages Vdata to a plurality of data lines DL1 to DLd provided in the display area DA of the display panel 100, a control driver 400 which controls driving of the gate driver 200 and the data driver 300, and a power supply unit 500 which supplies power to the control driver 400, the gate driver 200, the data driver 300, and the display panel 100.

First, the display panel 100 can include a display area DA and a non-display area NDA. Gate lines GL1 to GLg, data lines DL1 to DLd, and pixels P can be provided in the display area DA. Accordingly, an image can be displayed in the display area DA. Here, g and d are natural numbers. The non-display area NDA can surround the outer periphery of the display area DA.

When a display apparatus according to an embodiment of the present disclosure is a light emitting display apparatus, a pixel P included in the display panel 100, as illustrated in FIG. 2A, can include a pixel driving circuit PDC which includes a switching transistor Tsw1, a storage capacitor Cst, a driving transistor Tdr, and a sensing transistor Tsw2, and a light emitting device ED connected to the pixel driving circuit PDC.

A first terminal of the driving transistor Tdr can be connected to a first voltage supply line PLA through which a first voltage EVDD is supplied, and a second terminal of the driving transistor Tdr can be connected to the light emitting device ED.

A first terminal of the switching transistor Tsw1 can be connected to a data line DL, a second terminal of the switching transistor Tsw1 can be connected to a gate of the driving transistor Tdr, and a gate of the switching transistor Tsw1 can be connected to a gate line GL.

A data voltage Vdata can be supplied through the data line DL from the data driver 300. A gate signal GS can be supplied through the gate line GL from the gate driver 200. The gate signal GS can include a gate pulse GP (as shown in FIG. 4 that will be described later) for turning on the switching transistor Tsw1 and a gate-off signal for turning off the switching transistor Tsw1.

The sensing transistor Tsw2 can be provided for measuring a threshold voltage of the driving transistor Tdr or mobility of an electrical charge (for example, an electron), or supplying a reference voltage Vref to the pixel driving circuit PDC. A first terminal of the sensing transistor Tsw2 can be connected to the second terminal of the driving transistor Tdr and the light emitting device ED, a second terminal of the sensing transistor Tsw2 can be connected to a sensing line SL through which the reference voltage Vref is supplied, and a gate of the sensing transistor Tsw2 can be connected to a sensing control line SCL through which a sensing control signal SCS is supplied.

The sensing line SL can be connected to the data driver 300 and can be connected to the power supply unit 500 through the data driver 300. For example, the reference voltage Vref supplied from the power supply unit 500 can be supplied to the pixels through the sensing line SL, sensing signals transmitted from the pixels P can be converted into digital sensing signals in the data driver 300, and the digital sensing signals can be transmitted to the control driver 400.

The light emitting device ED can include a first electrode supplied with a first voltage EVDD through the driving transistor Tdr, a second electrode connected to a second voltage supply line PLB through which a second voltage is supplied, and a light emitting layer provided between the first electrode and the second electrode. The first electrode can be an anode and the second electrode can be a cathode.

When a display apparatus according to an embodiment of the present disclosure is a liquid crystal display apparatus, the pixel P provided in the display panel 100, as illustrated in FIG. 2B, can include a pixel driving circuit PDC including a switching transistor Tsw1 and a common electrode, and a light emitting unit including a liquid crystal.

For example, in FIG. 2B, a reference numeral Clc denotes a liquid crystal provided between the common electrode and a pixel electrode which is connected to the switching transistor Tsw1, and a reference numeral Vcom denotes a common voltage supplied to the common electrode. That is, the pixel electrode is connected to the switching transistor Tsw1, and the common voltage Vcom is supplied to the common electrode.

In this case, the display apparatus can further include a backlight which outputs light to the display panel 100.

The structure of the pixel P applied to a display apparatus according to an embodiment of the present disclosure is not limited to the structure illustrated in FIGS. 2A and 2B. Accordingly, the structure of the pixel P can be changed to various shapes.

The control driver 400 can realign input image data Ri, Gi, and Bi transmitted from an external system 600 by using a timing synchronization signal TSS (shown in FIG. 3) transmitted from the external system and can generate a data control signal DCS which is to be supplied to the data driver 300 and a gate control signal GCS which is to be supplied to the gate driver 200.

To this end, as illustrated in FIG. 3, the control driver 400 can include a data aligner 430 which realigns input image data Ri, Gi, and Bi to generate image data Data, a control signal generator 420 which generates the gate control signal GCS and the data control signal DCS by using the timing synchronization signal TSS, an input unit 410 which transmits the timing synchronization signal TSS transmitted from the external system 600 to the control signal generator 420 and transmits the input image data Ri, Gi, and Bi transmitted from the external system 600 to the data aligner 430, and an output unit 440 which supplies the data driver 300 with the image data Data generated by the data aligner 430 and the data control signal DCS generated by the control signal generator 420 and supplies the gate driver 200 with the gate control signal GCS generated by the control signal generator 420.

The control signal generator 420 can generate a power control signal PCS supplied to the power supply unit 500.

The control driver 400 can further include a storage unit 450 for storing various information. The storage unit 450 can be included in the control driver 400 as illustrated in FIG. 3, but can be separated from the control driver 400 and provided independently.

The external system 600 can perform a function of driving the control driver 400 and an electronic device.

For example, when the electronic device is a television (TV), the external system 600 can receive various kinds of sound information, image information, and letter information over a communication network and can transmit the received image information to the control driver 400. For example, the external system 600 can convert the image information into input image data Ri, Gi, and Bi and transmit the input image data Ri, Gi, and Bi to the control driver 400.

The power supply unit 500 can generate various powers and supply the generated powers to the control driver 400, the gate driver 200, the data driver 300, and the display panel 100.

The gate driver 200 can be directly embedded into the non-display area NDA by using a gate-in panel (GIP) type, or the gate driver 200 can be provided in the display area DA in which the pixels P are provided, or the gate driver 200 can be provided on a chip on film mounted in the non-display area NDA.

The gate driver 200 can supply gate pulses GP1 to GPg to the gate lines GL1 to GLg.

When a gate pulse GP generated by the gate driver 200 is supplied to a gate of the switching transistor Tsw1 included in the pixel P, the switching transistor Tsw1 can be turned on. When the switching transistor Tsw1 is turned on, data voltage Vdata supplied through a data line DL can be supplied to the pixel P.

When a gate-off signal generated by the gate driver 200 is supplied to the switching transistor Tsw1, the switching transistor Tsw1 can be turned off. When the switching transistor Tsw1 is turned off, a data voltage cannot be supplied to the pixel P any longer.

The gate signal GS supplied to the gate line GL can include the gate pulse GP and the gate-off signal.

To supply gate pulses GP1 to GPg to gate lines GL1 to GLg, the gate driver 200, as illustrated in FIG. 4, can include stages ST1 to STg connected to gate lines GL1 to GLg.

Each of the stages ST1 to STg can be connected to one gate line GL, but can be connected to at least two gate lines GL.

In order to generate gate pulses GP1 to GPg, a gate start signal VST and at least one gate clock GCLK which are generated by the control signal generator 420 can be transferred to the gate driver 200. For example, the gate start signal VST and the at least one gate clock GCLK can be included in the gate control signal GCS.

One of the stages ST1 to STg can be driven by a gate start signal VST to output a gate pulse GP to a gate line GL. The gate pulse GP can be generated by a gate clock GCLK.

At least one of signals output from a stage ST where a gate pulse is output can be supplied to another stage ST to drive another stage ST. Accordingly, a gate pulse can be output in another stage ST. For example, the stages ST can be driven sequentially to sequentially supply the gate pulses GP to the gate lines GL.

In the following description, when it is necessary to distinguish the stages, the reference numeral of ST1 to STg can be used, and when the stages are collectively referred to, the reference numeral of ST can be used.

The data driver 300 can supply data voltages Vdata to the data lines DL1 to DLd.

To this end, the data driver 300, as illustrated in FIG. 5, can include a shift register 310 which outputs a sampling signal, a latch 320 which latches image data Data received from the control driver 400, a digital-to-analog converter 330 which converts the image data Data, transmitted from the latch 320, into a data voltage Vdata and outputs the data voltage Vdata, and an output buffer 340 which outputs the data voltage, transmitted from the digital-to-analog converter 330, to the data line DL on the basis of a source output enable signal SOE.

The shift register 310 can output the sampling signal by using the data control signal DCS received from the control signal generator 420. For example, the data control signals DCS transmitted to the shift register 310 can include a source start pulse SSP and a source shift clock signal SSC.

The latch 320 can latch image data Data sequentially received from the control driver 400, and then output the image data Data to the digital-to-analog converter 330 at the same time on the basis of the sampling signal.

The digital-to-analog converter 330 can convert the image data Data transmitted from the latch 320 into data voltages Vdata and output the data voltages Vdata.

The output buffer 340 can simultaneously output the data voltages Vdata transmitted from the digital-to-analog converter 330 to data lines DL1 to DLd of the display panel 100 on the basis of the source output enable signal SOE transmitted from the control signal generator 420.

To this end, the output buffer 340 can include a buffer 341 which stores the data voltage Vdata transmitted from the digital-to-analog converter 330 and a switch 342 which outputs the data voltage Vdata stored in the buffer 341 to the data line DL on the basis of the source output enable signal SOE.

For example, when the switches 342 are turned on based on the source output enable signal SOE simultaneously supplied to the switches 342, the data voltages Vdata stored in the buffers 341 can be supplied to the data lines DL1 to DLd through the switches 342.

The data voltages Vdata supplied to the data lines DL1 to DLd can be supplied to pixels P connected to a gate line GL supplied with a gate pulse GP.

Figure 6:
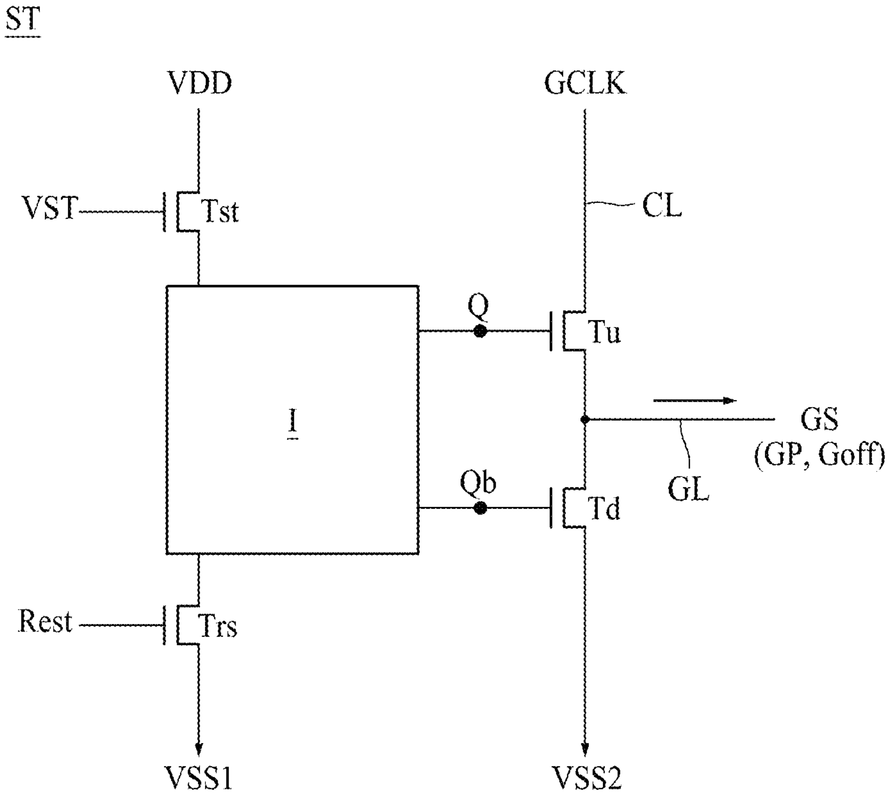
FIG. 6 is an example diagram schematically illustrating a configuration of a stage illustrated in FIG. 4.

FIG. 6 is an example diagram schematically illustrating a configuration of a stage illustrated in FIG. 4. For example, the stage illustrated in FIG. 6 can be any one of the stages ST1 to STg illustrated in FIG. 4. In the following descriptions, details which are the same as or similar to details described with reference to FIGS. 1 to 5 are omitted or will be simply described.

As described above, the gate driver 200 can be directly embedded in the non-display area NDA or the display area DA by using the gate in panel (GIP) type.

In this case, the transistors configuring the gate driver 200 can be provided in the non-display area NDA or the display area through the same process as the transistors provided in the pixels P of the display area DA.

The gate driver 200 supplies gate pulses GP to the gate lines GL1 to GLg. The gate signal GS can include a gate pulse GP and a gate-off signal Goff.

In order to supply the gate signals GSs to the gate lines GL1 to GLg, the gate driver 200 includes stages ST1 to STg connected to the gate lines GL1 to GLg, as illustrated in FIG. 4. Each of the stages ST1 to STg can be connected to one gate line GL, but can also be connected to at least two gate lines GL.

Hereinafter, for convenience of description, a gate driver 200, in which each of the stages ST1 to STg is, as illustrated in FIGS. 4 and 6, connected to one gate line GL, is described as an example of a gate driver applied to a display apparatus according to an embodiment of the present disclosure.

A stage ST provided in the gate driver 200 includes a plurality of transistors.

For example, in order to describe the schematic configuration of the stage ST, a stage ST with four transistors Tst, Trs, Tu, and Td is illustrated in FIG. 6 as an example of a stage ST applied to a display apparatus according to an embodiment of the present disclosure.

A start transistor Tst is turned on by the gate start signal VST to supply a first driving voltage VDD to a gate of a pull-up transistor Tu through a circuit unit I and a Q node Q.

As illustrated in FIG. 6, when the pull-up transistor Tu is an N-type transistor, the first driving voltage VDD can be a voltage higher than a 2a-th driving voltage VSS1 and a 2b-th driving voltage VSS2. For example, the first driving voltage VDD can be a voltage having a high level, and the 2a-th driving voltage VSS1 and the 2b-th driving voltage VSS2 can be voltages having a low level.

The gate start signal VST can be a signal transmitted from the control signal generator 420, a gate pulse GP transmitted from a front stage, or another signal transmitted from a front stage.

Here, the front stage can be a stage directly adjacent to a current stage, or can be a stage spaced apart from a current stage with at least one stage interposed therebetween.

The pull-up transistor Tu is turned on by the first driving voltage VDD supplied through the start transistor Tst to output a gate clock GCLK to a gate line GL. In this case, a gate pulse GP having, for example, a high level is output to a gate line GL.

That is, the gate clock GCLK is changed into the gate pulse GP by the pull-up transistor Tu and output to the gate line GL. Accordingly, when the pull-up transistor Tu is maintained in a state in which the pull-up transistor Tu is turned on during at least a period corresponding to a pulse width of the gate clock GCLK, the gate pulse GP has the same shape as the gate clock GCLK.

The switching transistor Tsw1 can be turned on by the gate pulse GP supplied to a gate of the switching transistor Tsw1 provided in the pixel driving circuit PDC.

While the first driving voltage VDD is supplied to the gate of the pull-up transistor Tu and the pull-up transistor Tu is turned on, a Qb node voltage having a low level and supplied to the circuit unit I can be supplied to a gate of a pull-down transistor Td.

The pull-down transistor Td is turned off by the low-level Qb node voltage supplied to the gate of the pull-down transistor Td. When the pull-down transistor Td is, as illustrated in FIG. 6, an N-type transistor, the Qb node voltage can be a voltage lower than the first driving voltage VDD. The Qb node voltage can be the 2a-th driving voltage VSS1, but can be another voltage supplied from the power supply unit 500.

In the following description, a high level refers to a level capable of turning on an N-type transistor as illustrated in FIG. 6, and a low level refers to a level capable of turning off the N-type transistor as illustrated in FIG. 6.

As described above, while the first driving voltage VDD having the high level is supplied to the gate of the pull-up transistor Tu and the pull-up transistor Tu is turned on, the pull-down transistor Td is turned off by the Qb node voltage having the low level.

Accordingly, only a gate pulse GP passing through the pull-up transistor Tu is output to a gate line GL.

When the start transistor Tst is turned off and a reset transistor Trs is turned on by a reset signal Rest, the 2a-th driving voltage VSS1 having a low level is supplied to the pull-up transistor Tu through the reset transistor Trs and the circuit unit I, and thus the pull-up transistor Tu is turned off.

While the 2a-th driving voltage VSS1 is supplied to the gate of the pull-up transistor Tu and the pull-up transistor Tu is turned off, the Qb node voltage having the high level and supplied to the circuit unit I can be supplied to the gate of the pull-down transistor Td. The high-level Qb node voltage can be the first driving voltage VDD, but can be another voltage supplied from the power supply unit 500.

The pull-down transistor Td is turned on by the high-level Qb node voltage supplied to the gate of the pull-down transistor Td.

When the pull-down transistor Td is turned on by the high-level Qb node voltage, the 2b-th driving voltage VSS2 having a low level is supplied to the gate line GL through the pull-down transistor Td.

Therefore, a gate-off signal Goff having a low level is output to the gate line GL.

That is, the gate-off signal Goff having the low level is output to the gate line GL through the pull-down transistor Td.

The switching transistor Tsw1 can be turned off by the gate-off signal Goff supplied to the gate of the switching transistor Tsw1 provided in the pixel driving circuit PDC.

As described above, while the 2a-th driving voltage VSS1 having a low level is supplied to the gate of the pull-up transistor Tu and the pull-up transistor Tu is turned off, the pull-down transistor Td is turned on by the high-level Qb node voltage.

Accordingly, only the gate-off signal Goff passing through the pull-down transistor Td is output to the gate line GL.

By the above-described operations, the switching transistor Tsw1 provided in the pixel driving circuit PDC can repeat the turn-on operation and the turn-off operation.

As described above, the stage ST includes the pull-up transistor Tu for outputting the gate pulse GP and the pull-down transistor Td for outputting the gate-off signal Goff, and in order to turn on or off the pull-up transistor Tu and turn off or turn on the pull-down transistor Td, the circuit unit I can be changed into various structures.

Figure 7:
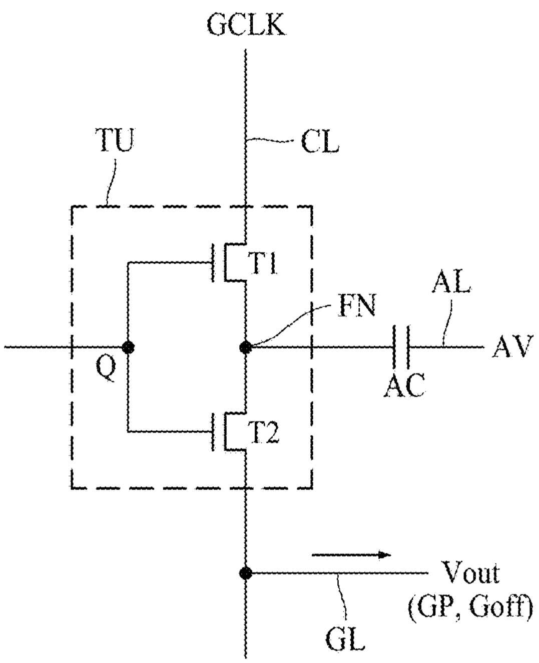
FIG. 7 is an example diagram illustrating a structure of a pull-up transistor illustrated in FIG. 6.

FIG. 7 is an example diagram illustrating a structure of a pull-up transistor illustrated in FIG. 6.

As described above, the pull-up transistor Tu can perform a function of outputting the gate pulse GP, and the pull-down transistor Td can perform a function of outputting the gate-off signal Goff.

In this case, each of the pull-up transistor Tu and the pull-down transistor Td can be composed of one transistor, but as illustrated in FIG. 7, can be composed of two transistors connected to each other.

For example, as illustrated in FIGS. 6 and 7, when the pull-up transistor Tu is provided between a gate line GL and a clock line CL to which the gate clock GCLK is supplied, the pull-up transistor Tu can include a first transistor T1 and a second transistor T2 connected to each other. In this case, an auxiliary capacitor AC can be connected to a floating node FN between the first transistor T1 and the second transistor T2.

For example, because the pull-up transistor Tu performs a switch function, the pull-up transistor Tu should be quickly turned on or off. This function can be achieved by a transistor using a low temperature polycrystalline silicon (LTPS).

Accordingly, the pull-up transistor Tu can be formed of a LTPS.

For example, because a transistor using LTPS has a higher charge mobility than amorphous silicon (Amorphous Silicon, a-Si), the transistor using LTPS can be used as a high-speed switching transistor.

However, in a transistor using LTPS, a leakage current is greater than that of amorphous silicon. That is, in general, when a transistor is turned off, current must not flow through the transistor. However, in a transistor using LTPS, a leakage current can occur while the transistor is turned off.

To prevent such leakage current, a transistor for switching can be configured by using two transistors using LTPS.

Therefore, the pull-up transistor Tu used as a switch uses LTPS, and particularly, in order to prevent leakage current, as illustrated in FIG. 7, the pull-up transistor Tu can use two transistors T1 and T2 using LTPS.

In this case, a first terminal of the first transistor T1 can be connected to the clock line CL, a second terminal of the first transistor T1 can be connected to the floating node FN, and a gate of the first transistor T1 can be connected to a Q node Q.

Also, a first terminal of the second transistor T2 can be connected to the floating node FN, a second terminal of the second transistor T2 can be connected to the gate line GL, and a gate of the second transistor T2 can be connected to the Q node Q.

Therefore, the gate of the first transistor T1 and the gate of the second transistor T2 can be commonly connected to the Q node Q.

Owing to the above-described structure, the first transistor T1 and the second transistor T2 can perform the function of the pull-up transistor Tu.

For example, as described above, when the high-level first driving voltage VDD is supplied to the Q node Q, the high-level first driving voltage VDD is also supplied to the gate of the first transistor T1 and the gate of the second transistor T2.

In this case, because the first transistor T1 and the second transistor T2 are N-type transistors, the first transistor T1 and the second transistor T2 can be turned on by the high-level first driving voltage VDD.

When the first transistor T1 and the second transistor T2 are turned on, the gate clock GCLK is supplied to the gate line GL through the first transistor T1 and the second transistor T2. In this case, the signal supplied to the gate line GL can be the gate pulse GP.

Also, as described above, when the low-level 2a-th driving voltage VSS1 is supplied to the Q node Q, the low-level 2a-th driving voltage VSS1 is also supplied to the gate of the first transistor T1 and the gate of the second transistor T2.

In this case, because the first transistor T1 and the second transistor T2 are N-type transistors, the first transistor T1 and the second transistor T2 can be turned off by the low-level 2a-th driving voltage VSS1.

While the first and second transistors T1 and T2 are turned off, the pull-down transistor Td can be turned on. When the pull-down transistor Td is turned on, the 2b-th driving voltage VSS2 is supplied to the gate line GL through the pull-down transistor Td. In this case, the signal supplied to the gate line GL can be the gate-off signal Goff.

A node between the first transistor T1 and the second transistor T2 is referred to as a floating node FN. That is, the floating node FN refers to a node to which the second terminal of the first transistor T1 and the first terminal of the second transistor T2 are connected.

An auxiliary capacitor AC is connected to the floating node FN.

For example, the auxiliary capacitor AC is connected between an auxiliary line AL to which an auxiliary voltage AV is supplied and the floating node FN.

A Direct Current voltage (hereinafter, referred to as a DC voltage) is used as the auxiliary voltage.

The auxiliary voltage AV can be the same voltage as the common voltage commonly supplied to all of the pixels P provided in the display panel 100.

For example, the auxiliary voltage AV can be the same as a voltage supplied to the common electrode provided in the pixels P.

To provide an additional description, when a display apparatus according to an embodiment of the present disclosure is a liquid crystal display apparatus, the pixel driving circuit PDC is, as described with reference to FIG. 2B, provided with the pixel electrode and the common electrode, and a liquid crystal is provided between the pixel electrode and the common electrode.

In this case, the common electrodes provided in all pixels P can be electrically connected to each other, and the common voltage Vcom can be supplied to the common electrodes.

Therefore, when a display apparatus according to an embodiment of the present disclosure is a liquid crystal display apparatus, the auxiliary voltage AV can be the common voltage Vcom commonly supplied to common electrodes provided in the pixels P.

Also, the auxiliary voltage AV can be the same as a voltage supplied to a cathode provided in the pixels P.

In addition, when the display apparatus according to an embodiment of the present disclosure is a light emitting display apparatus, the light emitting device ED, as described with reference to FIG. 2A, includes an anode, a light emitting layer, and a cathode.

In this case, cathodes provided in all the pixels P can be electrically connected to each other, and a cathode voltage can be supplied to the cathodes. That is, the same voltage (cathode voltage) can be supplied to all the cathodes.

Therefore, when a display apparatus according to an embodiment of the present disclosure is a light emitting display apparatus, the auxiliary voltage AV can be a cathode voltage commonly supplied to cathodes provided in the pixels P.

Figure 8:
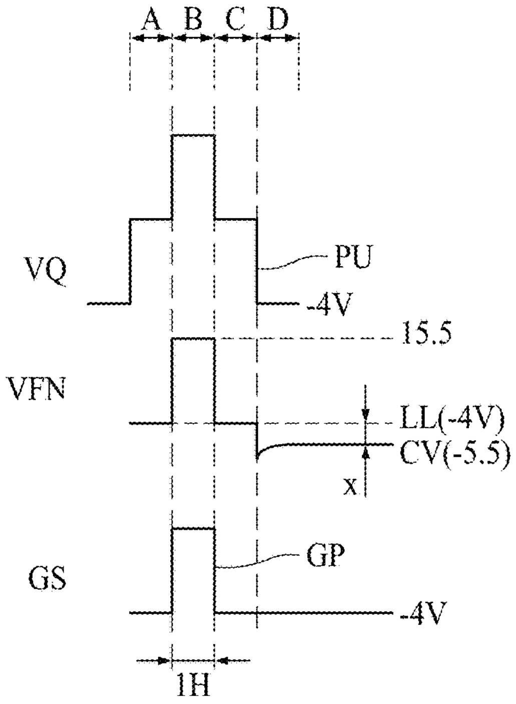
FIG. 8 is an example diagram for explaining a driving principle of a display apparatus according to an embodiment of the present disclosure.

FIG. 8 is an example diagram for explaining a driving principle of a display apparatus according to an embodiment of the present disclosure.

As described above, the pull-up transistor Tu can be formed using LTPS, and in particular, can be configured using the first transistor T1 and the second transistor T2 using the LTPS. The gate of the first transistor T1 and the gate of the second transistor T2 share the Q node Q.

In this case, as illustrated in FIGS. 7 and 8, when a high-level Q node voltage VQ is supplied to the Q node Q and a gate clock GCLK is supplied through the clock line CL, a voltage of the floating node FN (hereinafter, simply referred to as a floating node voltage VFN) rises to the high level of the gate clock GCLK.

In this case, the high-level Q node voltage VQ is coupled to the floating node voltage VFN, and further increases together with the high-level floating node voltage VFN.

That is, the floating node voltage VFN is increased by the gate clock GCLK supplied through the first transistor T1, and accordingly, a high-level gate pulse GP can be output through the gate line GL.

In this case, the voltage having the high level among the Q node voltages VQ supplied to the Q node Q is a voltage capable of turning on the first transistor T1 and the second transistor T2. In the following description, in particular, a voltage capable of turning on the first transistor T1 and the second transistor T2 among the Q node voltages VQ is referred to as a pull-up pulse PU. For example, as illustrated in FIG. 8, a voltage having the high level among the Q node voltages VQ is referred to as a pull-up pulse PU.

For example, the width of the pull-up pulse PU having a high level among the Q node voltages VQ supplied to the Q node Q is greater than the width of the gate clock GCLK, as illustrated in FIG. 8.

In addition, the floating node voltage VEN is due to the gate clock GCLK, and thus, the width of an area in which the floating node voltage VFN has a high level in FIG. 8 is the same as or similar to the width of the gate clock GCLK.

Accordingly, when the width of the gate clock GCLK is 1H, the width of the pull-up pulse PU supplied to the Q node Q can be 3H.

To provide an additional description, as illustrated in FIGS. 7 and 8, the width of the pull-up pulse PU supplied to the Q node Q can be three times the width of the gate clock GCLK.

For example, if a period corresponding to 1H elapses after the pull-up pulse PU is supplied to the Q node Q, the gate clock GCLK is supplied to the first terminal of the first transistor T1 for 1H.

In this case, the floating node voltage VFN is coupled to the gate clock GCLK and rises, and the pull-up pulse PU, which is the voltage of the Q node Q, is also coupled to the gate clock GCLK and rises.

When a period corresponding to 2H elapses after the pull-up pulse PU is supplied to the Q node Q, the gate clock GCLK is no longer supplied, and accordingly, the floating node voltage VEN falls to a low level, and the coupled and raised pull-up pulse PU also falls to the original high level.

When a period corresponding to 3H elapses after the pull-up pulse PU is supplied to the Q node Q, the pull-up pulse PU is no longer supplied to the Q node Q. Here, 1H can be a period in which the gate pulse GP is output, and thus, a period in which the data voltage supplied through the data line DL is supplied to the pixel through the switching transistor Tsw1.

As described above, the pull-up pulse PU can be supplied to the Q node Q during 3H.

In a first period A of the 3H period, only the pull-up pulse PU is supplied to the Q node Q.

In a second period B of the 3H period, the pull-up pulse PU is supplied to the Q node Q, and the gate clock GCLK is supplied to the first terminal of the first transistor T1. Accordingly, the high-level gate clock GCLK is supplied to the floating node FN through the first transistor T1. Accordingly, the floating node voltage VFN increases to a high level. The high level of the gate clock GCLK can be, for example, 15.5 V. Accordingly, the floating node voltage VFN can have a value similar to 15.5 V.

In this case, the Q node voltage VQ can be coupled to the floating node voltage VFN to further increase.

In a third period C of the 3H period, the gate clock GCLK is not supplied, and only the pull-up pulse PU is supplied to the Q node Q. Accordingly, the Q node voltage VQ returns to its original high level, and the floating node voltage VFN also returns to the low level LL. Here, the low level LL of the floating node voltage VFN can be, for example, −4 V.

After the third period C has elapsed, in a fourth period D, the high-level pull-up pulse PU is not supplied to the Q node Q, and the low-level Q node voltage VQ is supplied to the Q node Q.

That is, the Q node voltage VQ drops from the high level to the low level. Here, the low level of the Q node voltage VQ can be, for example, −4 V.

The floating node voltage VFN, which has already fallen to the low level LL in the third period C, can be coupled to the Q node voltage VQ falling to the low level in the fourth period D and can fall to a voltage lower than the low level LL, for example, to −5.5V.

Accordingly, a difference X between the coupling voltage CV, which is lowered by being coupled to the Q node Q during the fourth period D, of the floating node FN and the low level LL of the floating node, can be 1.5 V.

The above-described process can be repeated every one-frame period (1 Frame Period) in which the gate pulse GP is output to the gate line GL through the pull-up transistor Tu.

When this process is repeated, for example, the performance of the first terminal used as a drain of the first transistor T1 can be degraded. This phenomenon is referred to as hot carrier stress.

Particularly, in the first transistor T1 using LTPS with high charge mobility, the above-described hot carrier stress phenomenon can occur severely.

To provide an additional description, when the first transistor T1 and the second transistor T2 using the LTPS are used as the pull-up transistor Tu, the voltage of the floating node FN between the first transistor T1 and the second transistor T2 can be coupled to the Q node voltage VQ. Therefore, when the Q node voltage VQ drops from the high level to the low level, the floating node voltage VFN can drop to the coupling voltage CV which is lower than the low level LL.

The difference between the low level LL and the coupling voltage CV in the floating node FN can form a difference voltage Vgs between the gate and a source of the first transistor T1, and can form a difference voltage Vgs between the gate and a source of the second transistor T2.

In this case, the hot carrier stress can be generated in the first transistor T1 by the gate clock GCLK continuously supplied to the first terminal of the first transistor T1. The hot carrier stress can also be generated in the second transistor T2.

When the hot carrier stress is continuously generated in the first transistor T1 and the second transistor T2, the first transistor T1 and the second transistor T2 can be deteriorated, and accordingly, the quality of the first transistor T1 and the second transistor T2 can be degrade.

If the quality of the first transistor T1 and the second transistor T2 is degraded, the falling period of the gate pulse GP output through the first transistor T1 and the second transistor T2 can be delayed.

For example, in a normal case, a first gate pulse GP1 should be output to a first gate line GL1 in a first stage ST1 during the 1H period, and a second gate pulse GP2 should be output to a second gate line GL2 in a second stage ST2 during another 1H period. However, if the quality of the first transistor T1 and the second transistor T2 is degraded and the falling period of the first gate pulse GP1 is delayed, the first gate pulse GP1 can be maintained at a high level during 2H periods.

Therefore, while the second gate pulse GP2 is supplied to the second gate line GL2, the first gate pulse GP1 can be continuously supplied to the first gate line GL1.

Accordingly, abnormal light can be output from pixels connected to the first gate line GL1, and owing to such abnormal light, a horizontal band-shaped defect can occur.

Additionally, the horizontal band-shaped defect described above is caused by a phenomenon in which the floating node voltage VFN is coupled to the Q node voltage VQ, which falls to the low level, to fall to the coupling voltage CV lower than the low level LL, in the fourth period D.

Therefore, in a display apparatus according to an embodiment of the present disclosure, in order to prevent the floating node voltage VFN from being coupled to the Q node voltage falling to the low level and falling to the coupling voltage CV lower than the low level LL in the fourth period D, an auxiliary capacitor AC is connected to the floating node FN and a DC voltage can be supplied to the auxiliary capacitor AC.

Figure 9:
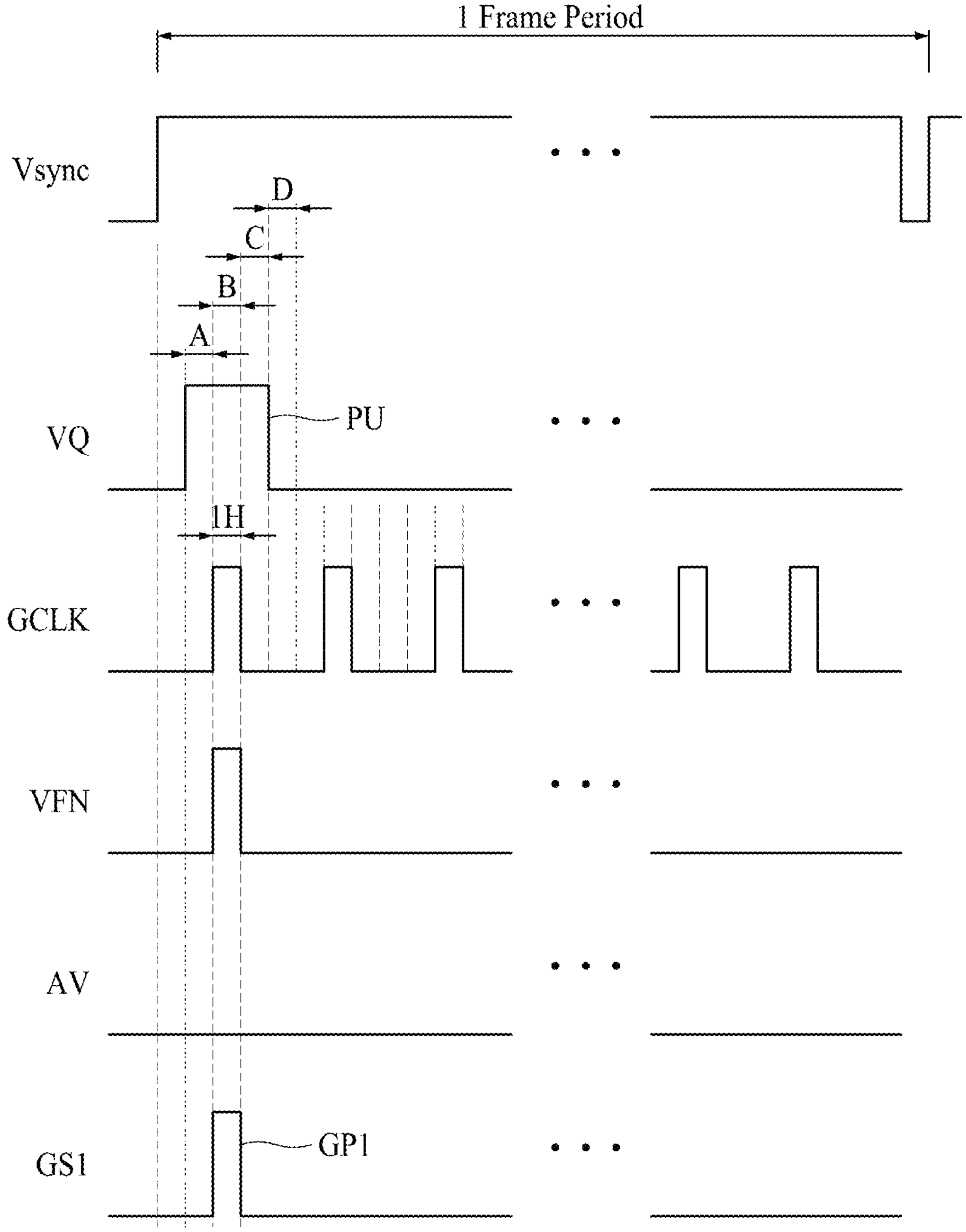
FIG. 9 is an example diagram illustrating signals applied to a display apparatus according to an embodiment of the present disclosure.
Figure 10:
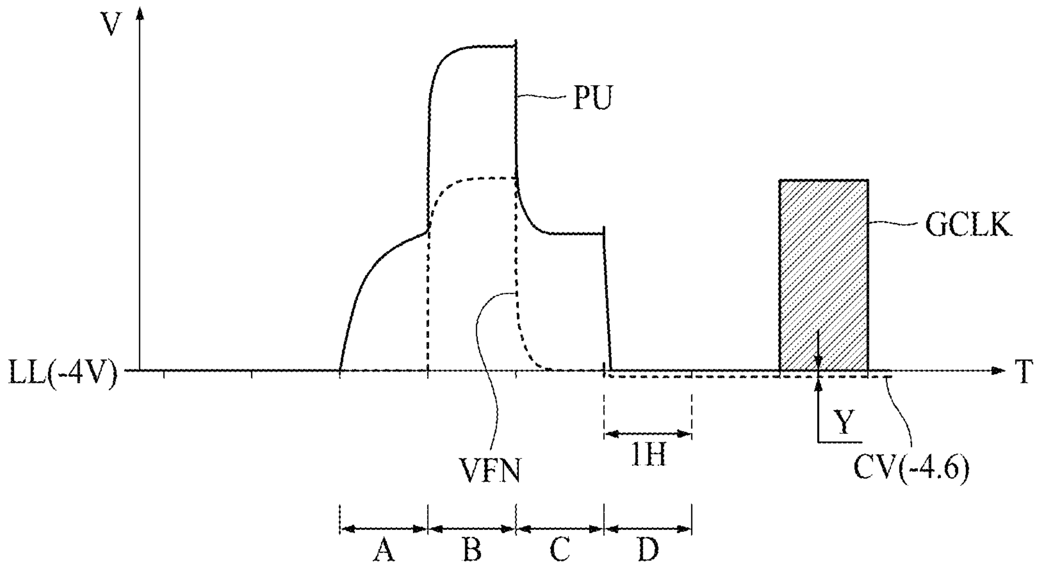
FIG. 10 is an example diagram illustrating a floating node voltage and a Q node voltage of a display apparatus according to an embodiment of the present disclosure.

FIG. 9 is an example diagram illustrating signals applied to a display apparatus according to an embodiment of the present disclosure, and FIG. 10 is an example diagram illustrating a floating node voltage and a Q node voltage of a display apparatus according to an embodiment of the present disclosure. Particularly, FIG. 9 illustrates a vertical synchronization signal Vsync defining a one-frame period (1frame period) in which one image is displayed from a display panel, a Q node voltage VQ in a first stage ST1, a gate clock GCLK supplied to the first stage ST1, a floating node voltage VFN of the first stage ST1, an auxiliary voltage AV supplied to an auxiliary capacitor AC of the first stage ST1, and a first gate signal GS1 output from the first stage ST1. In FIG. 10, a solid line represents the Q node voltage VQ, and a dotted line represents the floating node voltage VFN. Also, in the following description, the gate clock GCLK can denote a signal indicated by GCLK in FIG. 10, but can denote only a pulse having a high level among signals indicated by GCLK in FIG. 10.

Hereinafter, a method of driving a display apparatus according to an embodiment of the present disclosure will be described with reference to FIGS. 9 and 10.

In the following descriptions, details which are the same as or similar to details described with reference to FIGS. 1 to 8 are omitted or will be simply described.

As described above, when the pull-up transistor Tu is provided between the clock line CL to which the gate clock GCLK is supplied and the gate line GL, the pull-up transistor Tu can include the first transistor T1 and the second transistor T2 connected to each other. In this case, the auxiliary capacitor AC can be connected to the floating node FN between the first transistor T1 and the second transistor T2.

Each of the first transistor T1 and the second transistor T2 can be formed of a LTPS.

In this case, the first terminal of the first transistor T1 can be connected to the clock line CL, the second terminal of the first transistor T1 can be connected to the floating node FN, and the gate of the first transistor T1 can be connected to the Q node Q.

Also, the first terminal of the second transistor T2 can be connected to the floating node FN, the second terminal of the second transistor T2 can be connected to the gate line GL, and the gate of the second transistor T2 can be connected to the Q node Q.

Therefore, the gate of the first transistor T1 and the gate of the second transistor T2 can be commonly connected to the Q node Q.

Owing to the above-described structure, the first transistor T1 and the second transistor T2 can perform the function of the pull-up transistor Tu.

The auxiliary capacitor AC is connected to the floating node FN.

For example, the auxiliary capacitor AC is connected between the auxiliary line AL to which the auxiliary voltage AV is supplied and the floating node FN.

A DC voltage is used as an auxiliary voltage.

The auxiliary voltage AV can be the same voltage as the common voltage commonly supplied to all pixels P provided in the display panel 100.

For example, the auxiliary voltage AV can be the same as a voltage supplied to the common electrode provided in the pixels P.

To provide an additional description, when a display apparatus according to an embodiment of the present disclosure is a liquid crystal display apparatus, the auxiliary voltage AV can be a common voltage Vcom commonly supplied to common electrodes provided in the pixels P.

Also, when a display apparatus according to an embodiment of the present disclosure is a light emitting display apparatus, the auxiliary voltage AV can be a cathode voltage commonly supplied to cathodes provided in the pixels P.

In the following description, a voltage having a high level among the Q node voltages VQ supplied to the Q node Q means a voltage capable of turning on the first transistor T1 and the second transistor T2, and is referred to as a pull-up pulse PU.

For example, as illustrated in FIG. 9, a voltage having a high level among the Q node voltage VQ is referred to as a pull-up pulse PU.

Also, a voltage having a low level among the Q node voltages VQ supplied to the Q node Q means a voltage capable of turning off the first transistor T1 and the second transistor T2.

In this case, the low level of the Q node voltage VQ supplied to the Q node Q can be the same as the low level of the gate clock GCLK. For example, the low level of the Q node voltage VQ and the low level of the gate clock GCLK can be −4 V, as illustrated in FIG. 10.

Also, the auxiliary voltage AV supplied to the auxiliary capacitor AC can be equal to the low level of the gate clock GCLK. For example, the low level of the auxiliary voltage AV and the gate clock GCLK can be −4V, as illustrated in FIG. 10.

That is, in a display apparatus according to an embodiment of the present disclosure, in order to minimize the difference between the low level LL of the floating node FN and the coupling voltage CV, the low level of the Q node voltage VQ, the low level of the gate clock GCLK, and the auxiliary voltage AV can be set equally.

The width of the pull-up pulse PU having the high level among the Q node voltages VQ supplied to the Q node Q is larger than the width of the gate clock GCLK, as illustrated in FIG. 9.

For example, when the width of the gate clock GCLK is 1H, the width of the pull-up pulse PU supplied to the Q node Q can be 3H.

First, in a first period A of 3H periods, only the pull-up pulse PU is supplied to the Q node Q, as illustrated in FIGS. 9 and 10.

In the first period A, because the gate clock GCLK is not supplied to the floating node FN, the floating node FN is in a floating state.

In this case, because the auxiliary voltage AV is supplied to the auxiliary capacitor AC connected to the floating node FN, the voltage of the floating node FN can be the auxiliary voltage AV.

Next, in a second period B of the 3H periods, the pull-up pulse PU is supplied to the Q node Q, and the gate clock GCLK is supplied to a first terminal of the first transistor T1. In this case, the Q node voltage VQ can be coupled to the floating node voltage VFN, and thus can further increase, as described with reference to FIG. 8.

The gate clock GCLK supplied to the first terminal of the first transistor T1 is output to the first gate line GL1 through the floating node FN and the second transistor T2.

That is, the gate clock GCLK supplied in the second period B becomes the first gate pulse GP1 output to the first gate line GL1.

In this case, because the gate clock GCLK is supplied to the floating node FN, the floating node voltage VFN can become a high level of the gate clock GCLK.

Next, in a third period C of the 3H periods, the gate clock GCLK is not supplied, and only the pull-up pulse PU is supplied to the Q node Q. Accordingly, the voltage VQ of the Q node returns to its original high level, as described with reference to FIG. 8, and the floating node voltage VFN also returns to the low level LL. Here, the low level LL can be, for example, −4 V.

Next, after the third period C has elapsed, in a fourth period D, the high-level pull-up pulse PU is not supplied to the Q node Q, and the low-level Q node voltage VQ is supplied to the Q node Q.

That is, the Q node voltage VQ drops from the high level to the low level. Here, the low level of the Q node voltage VQ can be, for example, −4 V.

The floating node voltage VFN, which has already fallen to the low level LL in the third period C, can be coupled to the Q node voltage VQ falling to the low level in the fourth period D and can fall to a voltage lower than the low level LL.

However, the auxiliary capacitor AC to which the auxiliary voltage AV is supplied is connected to the floating node FN.

The auxiliary capacitor AC can be set to a voltage equal to the low level of the Q node voltage VQ and the low level of the gate clock GCLK.

Therefore, in the fourth period D, even if the floating node FN is coupled to the Q node voltage VQ, the floating node voltage FN is less lowered than in the case without the auxiliary capacitor AC.

For example, when the floating node FN is not connected to the auxiliary capacitor AC, the floating node voltage FN can drop to a level lower than the low level LL of the floating node by 1.5V, as described with reference to FIG. 8.

However, in a display apparatus according to an embodiment of the present disclosure, the floating node FN is connected to the auxiliary capacitor AC supplied with the auxiliary voltage AC, and thus, even if the floating node FN is coupled to the Q node voltage VQ, the floating node voltage VFN falls to a level less than 1.5V.

For example, in the fourth period D, the floating node voltage VFN can drop to a level smaller than the low level LL of the floating node by 0.6 V, as illustrated in FIG. 10.

To provide an additional description, when there is no auxiliary capacitor AC in the floating node FN, the difference X between the coupling voltage CV of the floating node FN and the low level LL of the floating node can be 1.5V in the fourth period D.

However, when the auxiliary capacitor AC is connected to the floating node FN and the auxiliary voltage AV having the same level as the low level of the gate clock GCLK is supplied to the auxiliary capacitor AC, the difference Y between the coupling voltage CV of the floating node FN and the low level LL of the floating node can be 0.6V in the fourth period D.

As described above, the hot carrier stress, which delays the falling period of the gate pulse by deteriorating the first transistor T1, is caused by a phenomenon in which the difference between the low level LL and the coupling voltage CV in the floating node FN increases.

However, in a display apparatus according to an embodiment of the present disclosure, as described above, the difference between the low level LL and the coupling voltage CV in the floating node FN can be reduced compared to the prior art by the auxiliary voltage AV supplied to the auxiliary capacitor AC.

Accordingly, the first transistor T1 may not be affected by the hot carrier stress, or can be affected by a smaller hot carrier stress than the prior art.

Therefore, compared to the prior art, the degree of deterioration of the first transistor T1 can be reduced, and accordingly, the delay in the falling period of the first gate pulse GP1 can be reduced.

As the delay in the falling period of the first gate pulse GP1 is reduced, the first gate pulse GP1 can be supplied to the first gate line GL1 only in the 1H period.

Accordingly, while the second gate pulse GP2 is output from the second stage ST2 to the second gate line GL2 in the third period C, the first gate pulse GP1 is not supplied to the first gate line GL1.

Therefore, the data voltages Vdata to be supplied to the pixels P connected to the second gate line GL2 are not supplied to the pixels P connected to the first gate line GL1.

Accordingly, a horizontal band-shaped defect does not occur in the display panel 100, and an image can be normally output.

Finally, the gate clock GCLK supplied to the first stage ST1 can be supplied to the first terminal of the first transistor T1 every 4H, for example. Accordingly, a gate clock GCLK supplied to the first terminal of the first transistor T1 after 3H from the second period B is illustrated in FIG. 10.

The gate clock GCLK supplied in the second period B can be output to the first gate line GL1 through the first transistor T1 and the second transistor T2 which are turned on by the pull-up pulse PU.

However, when a gate clock GCLK is supplied to the first terminal of the first transistor T1 after 3H from the second period B, the pull-up pulse PU is not supplied to the Q node Q. Accordingly, the first transistor T1 and the second transistor T2 are not turned on.

Therefore, the gate clock GCLK supplied to the first terminal of the first transistor T1 after 3H from the second period B is not output to the first gate line GL1.

Figure 11:
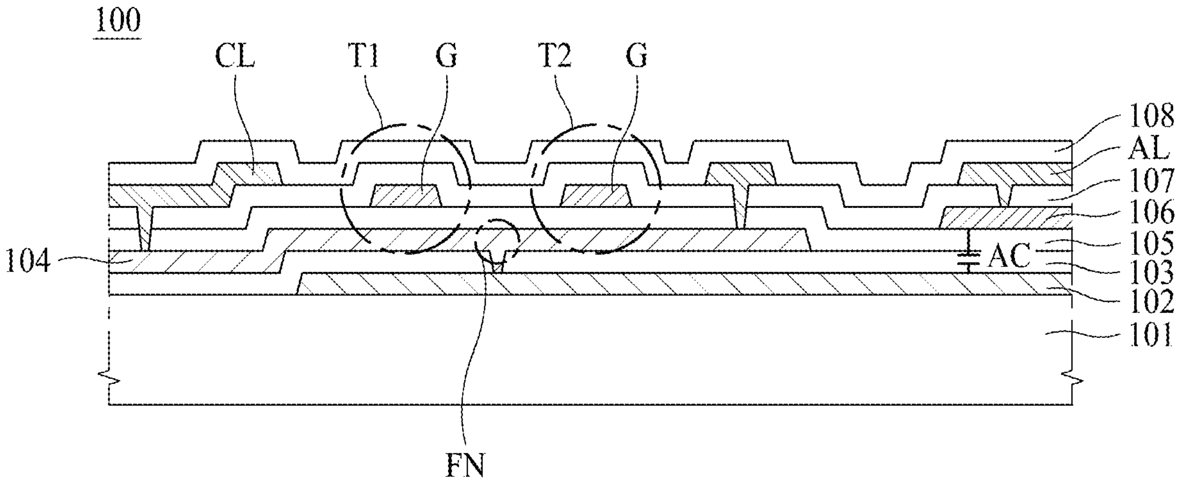
FIG. 11 is an example diagram illustrating a cross-sectional surface of a display panel applied to a display apparatus according to an embodiment of the present disclosure.

Hereinafter, as shown in FIG. 11, a cross-sectional structure of a display panel 10 applied to a display apparatus according to an embodiment of the present disclosure is described, and a method of calculating the capacitance of the auxiliary capacitor AC is described.

FIG. 11 is an example diagram illustrating a cross-sectional surface of a display panel applied to a display apparatus according to an embodiment of the present disclosure, and in particular, is an example view illustrating a cross section of a non-display area provided with a pull-up transistor TU, a floating node FN, and an auxiliary capacitor AC illustrated in FIG. 7.

As described above with reference to FIGS. 6 and 7, the pull-up transistor Tu includes a first transistor T1 and a second transistor T2, and the auxiliary capacitor AC can be connected to the floating node FN between the first transistor T1 and the second transistor T2.

For example, the display panel 100 applied to a display apparatus according to an embodiment of the present disclosure can include, as illustrated in FIG. 11, a substrate 101, a floating node connection electrode 102 provided on the substrate 101, a buffer layer 103 covering the floating node connection electrode 102, an active 104 provided on the buffer layer 103, a gate insulation layer 105 covering the active 104, two gate electrodes G and a connection electrode 106 provided on the gate insulation layer 105, a first passivation layer 107 covering the two gate electrodes G and the connection electrode 106, a clock line CL, a gate line GL, and an auxiliary line AL which are provided on the first passivation layer 107, and a second passivation layer 108 covering the clock line CL, the gate line GL (not shown), and the auxiliary line AL.

First, the substrate 101 can be any one of a glass substrate, a plastic substrate, a film, and a semiconductor substrate.

Next, the floating node connection electrode 102 can be provided on the substrate 101 and can be a first terminal of the auxiliary capacitor AC. The floating node connection electrode 102 can be formed by using at least one of various kinds of metals.

Next, the active 104 is provided on the buffer layer 103 covering the floating node connection electrode 102. An area between two gate electrodes G among the active 104 can be the floating node FN.

A first contact hole is formed in a region corresponding to the floating node FN, in the buffer layer 103, and the floating node FN can be connected to the floating node connection electrode 102 through the first contact hole.

Next, the two gate electrodes G and the connection electrode 106 can be provided on the gate insulation layer 105 covering the active 104.

The first transistor T1 and the second transistor T2 illustrated in FIG. 7 can be formed by the two gate electrodes G and the active 104.

The connection electrode 106 is disposed to overlap the floating node connection electrode 102.

The connection electrode 106 can be a second terminal of the auxiliary capacitor AC, and the floating node connection electrode 102 can be a first terminal of the auxiliary capacitor AC.

Next, the two gate electrodes G and the connection electrode 106 are covered by the first passivation layer 107, and the clock line CL, the gate line GL, and the auxiliary line AL can be provided on the first passivation layer 107.

A gate clock GCLK is supplied to the clock line CL, and a gate signal GS is output to the gate line GL.

An auxiliary voltage AV is supplied to the auxiliary line AL.

The auxiliary line AL can be connected to the connection electrode 106 through a second contact hole formed in the first passivation layer 107.

As described above, the connection electrode 106 overlaps the floating node connection electrode 102, and the floating node connection electrode 102 is connected to the floating node FN through the first contact hole.

Therefore, the auxiliary capacitor AC can be formed between the auxiliary line AL and the floating node FN.

For example, the floating node connection electrode 102, which is the first terminal of the auxiliary capacitor AC, can be connected to the floating node FN through the first contact hole, and the connection electrode 106, which is the second terminal of the auxiliary capacitor AC, can be connected to the auxiliary line AL through the second contact hole.

Next, the clock line CL, the gate line GL, and the auxiliary line AL can be covered by the second passivation layer 108.

Finally, when the display panel 100 illustrated in FIG. 11 is a liquid crystal display panel, a liquid crystal can be provided on the second passivation layer 108, and when the display panel 100 illustrated in FIG. 11 is a light emitting display panel, a light emitting device can be provided on the second passivation layer 108.

A structure of the display panel 100 applied to a display apparatus according to an embodiment of the present disclosure is not limited to the structure illustrated in FIG. 11, and can be changed to various structures.

In this case, the capacitance of the auxiliary capacitor AC (hereinafter, simply referred to as auxiliary capacitance) can be set by various simulations and tests.

For example, based on various simulations and tests, the auxiliary capacitance is proportional to a voltage (hereinafter, simply referred to as a gate source voltage Vgs) between the gate of the first transistor T1 and the floating node FN.

The gate source voltage Vgs can be expressed as Equation 1 below.

$$Vgs = \left(\Delta Vg \times \frac{Cgs \times Cgd}{Cgs \times Cgd \times \text{C\_floating}}\right) \times \text{Recovery} \quad \text{[Equation 1]}$$

In [Equation 1], ΔVg a is a difference value between a high level and a low level of the gate clock GCLK, Cgs is a capacitance between the gate and the source of the first transistor T1, Cgd is a capacitance between the gate and the drain of the first transistor T1, and C_Floating is a capacitance applied to the floating node FN. Also, Recovery refers to a period in which the difference X between the coupling voltage CV and the low level LL of the floating node becomes 0. In this case, the difference X between the coupling voltage CV and the low level LL of the floating node has been described with reference to FIG. 8. The Recovery is proportional to an initial threshold voltage of the first transistor T1.

Therefore, as reflected in [Equation 1], as the difference value ΔVg between the high level and the low level of the gate clock GCLK increases, the gate source voltage Vgs increases, and thus, the auxiliary capacitance should also increase.

Also, as the width of the active 104 of the first transistor T1 increases, the gate source voltage Vgs increases, and thus, the auxiliary capacitance should also increase.

Moreover, the initial threshold voltage of the first transistor T1 is proportional to the Recovery, and as the Recovery increases, the gate source voltage Vgs increases, and thus, the auxiliary capacitance should also increase.

Therefore, the size and capacitance of the auxiliary capacitor AC can be variously set in consideration of the above-described conditions.

The features of the display apparatus according to embodiments of the present disclosure may briefly be summarized as follows.

A display apparatus according to an embodiment of the present disclosure includes pixels configured to be connected to a gate line and a stage configured to output a gate signal to the gate line, wherein the stage includes a pull-up transistor provided between a clock line to which a gate clock is supplied and the gate line, the pull-up transistor includes a first transistor and a second transistor connected to each other, and an auxiliary capacitor is connected to a floating node between the first transistor and the second transistor.

A gate of the first transistor and a gate of the second transistor are commonly connected to a Q node.

A first terminal of the first transistor is connected to the clock line, a second terminal of the first transistor is connected to the floating node, a first terminal of the second transistor is connected to the floating node, and a second terminal of the second transistor is connected to the gate line.

Each of the first and second transistors is formed of a Low Temperature Polycrystalline Silicon (LTPS).

The auxiliary capacitor is provided between an auxiliary line to which an auxiliary voltage is supplied and the floating node.

The auxiliary voltage is a direct current (DC) voltage.

The auxiliary voltage is the same as a common voltage commonly supplied to the pixels.

The auxiliary voltage is the same as a voltage supplied to a common electrode provided in the pixels or the same as a voltage supplied to a cathode provided in the pixels.

A width of a pull-up pulse having a high level in a Q node voltage supplied to the Q node is greater than a width of the gate clock.

When a width of a pull-up pulse supplied to the Q node is 3H, a width of the gate clock is 1H.

A low level of a Q node voltage supplied to the Q node is the same as a low level of the gate clock.

The auxiliary voltage is the same as a low level of the gate clock.

The display apparatus according to the present disclosure can be applied to all electronic devices including a display panel. For example, the light emitting display apparatus according to the present disclosure can be applied to a virtual reality (VR) device, an augmented reality (AR) device, a mobile device, a video phone, a smart watch, a watch phone, or a wearable device, foldable device, rollable device, bendable device, flexible device, curved device, electronic notebook, e-book, PMP (portable multimedia player), PDA (personal digital assistant), MP3 player, mobile medical device, desktop PC, laptop PC, netbook computer, workstation, navigation, car navigation, vehicle display apparatus, televisions, wall paper display apparatus, signage devices, game devices, laptops, monitors, cameras, camcorders, and home appliances.

According to a display apparatus according to an embodiment of the present disclosure, an auxiliary voltage can be supplied to a floating node between first and second transistors configuring a pull-up transistor of a gate driver, through an auxiliary capacitor.

A hot carrier stress applied to the first and second transistors can be reduced by the auxiliary voltage supplied to the floating node.

Accordingly, a falling delay of a gate pulse output through the pull-up transistor can be reduced.

Therefore, according to a display apparatus according to an embodiment of the present disclosure, a horizontal band-shaped defect occurring in a display panel can be reduced.

The above-described feature, structure, and effect of the present disclosure are included in at least one embodiment of the present disclosure but are not limited to only one embodiment. Furthermore, the feature, structure, and effect described in at least one embodiment of the present disclosure can be implemented through combination or modification of other embodiments by those skilled in the art. Therefore, content associated with the combination and modification should be construed as being within the scope of the present disclosure.

It will be apparent to those skilled in the art that various modifications and variations can be made in the present disclosure without departing from the spirit or scope of the disclosures. Thus, it is intended that the present disclosure covers the modifications and variations of this disclosure provided they come within the scope of the present disclosure.

What is claimed is:

1. A display apparatus, comprising:

a plurality of pixels connected to a gate line; and a stage configured to output a gate signal to the gate line, wherein the stage includes a pull-up transistor provided between a clock line configured to receive a gate clock and the gate line, wherein the pull-up transistor includes a first transistor and a second transistor connected to each other, wherein an auxiliary capacitor is connected to a floating node between the first transistor and the second transistor, wherein a first terminal of the first transistor is connected to the clock line, a second terminal of the first transistor is connected to the floating node, a first terminal of the second transistor is connected to the floating node, a second terminal of the second transistor is connected to the gate line, and a gate of the first transistor is connected to a gate of the second transistor, wherein the second terminal of the first transistor and the first terminal of the second transistor are connected to a first terminal of the auxiliary capacitor, and wherein the first terminal of the auxiliary capacitor is connected to the floating node, and a second terminal of the auxiliary capacitor is connected to an auxiliary line to which an auxiliary voltage is supplied.

2. The display apparatus of claim 1, wherein a gate of the first transistor and a gate of the second transistor are commonly connected to a Q node.

3. The display apparatus of claim 1, wherein each of the first and second transistors is formed of a Low Temperature Polycrystalline Silicon (LTPS).

4. The display apparatus of claim 1, wherein the auxiliary voltage is a direct current (DC) voltage.

5. The display apparatus of claim 1, wherein the auxiliary voltage is the same as a common voltage commonly supplied to the pixels.

6. The display apparatus of claim 1, wherein the auxiliary voltage is the same as a voltage supplied to a common electrode provided in the pixels or the same as a voltage supplied to a cathode provided in the pixels.

7. The display apparatus of claim 2, wherein a width of a pull-up pulse having a high level in a Q node voltage supplied to the Q node is greater than a width of the gate clock.

8. The display apparatus of claim 2, wherein a width of a pull-up pulse supplied to the Q node is three times a width of the gate clock.

9. The display apparatus of claim 2, wherein a low level of a Q node voltage supplied to the Q node is the same as a low level of the gate clock.

10. The display apparatus of claim 1, wherein the auxiliary voltage is the same as a low level of the gate clock.

* * * * *